United States Patent
Gültlinger et al.

(10) Patent No.: US 11,787,282 B2
(45) Date of Patent: Oct. 17, 2023

(54) HYBRIDISED DRIVETRAIN AND METHOD FOR CONTROLLING SAID DRIVETRAIN

(71) Applicant: Magna PT B.V. & Co. KG, Untergruppenbach (DE)

(72) Inventors: Johannes Gültlinger, Stuttgart (DE); Jens Saberi, Stuttgart (DE); Marcel Bresk, Stuttgart (DE); Andreas Hegerath, Bergheim (DE)

(73) Assignee: MAGNA PT B.V. & CO. KG, Untergruppenbach (DE)

( * ) Notice: Subject to any disclaimer, the term of this patent is extended or adjusted under 35 U.S.C. 154(b) by 0 days.

(21) Appl. No.: 17/778,460

(22) PCT Filed: Nov. 16, 2020

(86) PCT No.: PCT/EP2020/082273
§ 371 (c)(1),
(2) Date: May 20, 2022

(87) PCT Pub. No.: WO2021/099269
PCT Pub. Date: May 27, 2021

(65) Prior Publication Data
US 2022/0410691 A1     Dec. 29, 2022

(30) Foreign Application Priority Data
Nov. 22, 2019 (DE) .......................... 102019218075.2

(51) Int. Cl.
*B60K 6/48* (2007.10)
*B60K 6/365* (2007.10)
(Continued)

(52) U.S. Cl.
CPC ................ *B60K 6/48* (2013.01); *B60K 6/365* (2013.01); *B60K 6/387* (2013.01); *F16H 3/62* (2013.01);
(Continued)

(58) Field of Classification Search
CPC .......... B60K 6/48; B60K 6/365; B60K 6/387; F16H 3/62; F16H 61/70
See application file for complete search history.

(56) References Cited

U.S. PATENT DOCUMENTS

| | | | |
|---|---|---|---|
| 2008/0121447 A1* | 5/2008 | Lang ........................ | B60K 6/48 903/910 |
| 2019/0100094 A1* | 4/2019 | Alonso ..................... | B60K 6/26 |

FOREIGN PATENT DOCUMENTS

| | | |
|---|---|---|
| DE | 102005022011 A1 | 12/2005 |
| DE | 112006002537 B4 | 8/2012 |

(Continued)

OTHER PUBLICATIONS

International Search Report for PCT/EP2020/082273 dated Feb. 12, 2021 (14 pages).

(Continued)

*Primary Examiner* — Derek D Knight
(74) *Attorney, Agent, or Firm* — Dickinson Wright PLLC (57) ABSTRACT

A hybridised drivetrain for a motor vehicle. A transmission assembly of the vehicle has at least one first planetary gear set. A first element of the first planetary gear set is a ring gear. A second element of the first planetary gear set can be connected to an electric machine of the vehicle with a clutch and can be secured against a housing. The second element is a sun gear. A third element of the first planetary gear set is connected to an output. The third element is a planet carrier. The ring gear can also be connected to the electric machine by means of a clutch. The clutch has an output disc carrier connected to the sun gear. The clutch has an output disc carrier connected to the ring gear. The input disc carrier and the output disc carrier can rotate relative to one another.

10 Claims, 4 Drawing Sheets

(51) Int. Cl.
    *B60K 6/387*     (2007.10)
    *F16H 3/62*     (2006.01)
    *F16H 61/70*     (2006.01)

(52) U.S. Cl.
    CPC ...... *F16H 61/70* (2013.01); *B60K 2006/4825* (2013.01); *B60Y 2200/92* (2013.01)

(56) References Cited

FOREIGN PATENT DOCUMENTS

| | | | | |
|---|---|---|---|---|
| DE | 102015216896 | A1 * | 3/2017 | |
| DE | 102015216896 | A1 | 9/2017 | |
| DE | 102016221735 | A1 | 5/2018 | |
| DE | 102018203563 | A1 * | 9/2019 | ............ B60K 6/365 |
| DE | 102018203563 | A1 | 9/2019 | |
| JP | 20091234 | A | 1/2009 | |

OTHER PUBLICATIONS

German Search Report for German Application No. 102019218075.2 dated Sep. 9, 2020 (7 pages).

* cited by examiner

Fig. 1

|  | A | B | C | D | E |
|---|---|---|---|---|---|
| ICE1 |  | x |  |  | x |
| ICE1 & EM2 |  | x |  | x | x |
| ICE2 & EM3 |  |  | x | x | x |
| ICE3 | x | x |  |  |  |
| ICE3 & EM2 | x | x |  | x |  |
| ICE4 & EM3 | x |  | x | x |  |
| EM1 (EM only) | x |  | x |  | x |
| EM2 / EM R |  | x |  | x |  |
| EM3 |  |  | x | x |  |
| EVT1 |  |  | x |  | x |
| EVT2 | x |  | x |  |  |
| Stillst. Para (N) | x |  |  | x |  |

|              | A | B | C | D | E |
|---|---|---|---|---|---|
| ICE1         |   | X |   |   | X |
| ICE1 & EM2   |   | X | X |   | X |
| ICE2 & EM3   |   |   | X | X | X |
| ICE3         | X | X |   |   |   |
| ICE3 & EM2   | X | X |   | X |   |
| ICE4 & EM3   | X |   | X | X |   |
| EM1 (EM only)| X |   |   | X | X |
| EM2 / EM R   |   | X | X |   |   |
| EM3          |   |   | X | X |   |
| EVT1         |   |   |   | X | X |
| EVT2         | X |   |   | X |   |
| Stillst. Para (N) | X |   | X |   |   |

Fig. 4

HYBRIDISED DRIVETRAIN AND METHOD FOR CONTROLLING SAID DRIVETRAIN

CROSS-REFERENCE TO RELATED APPLICATIONS

This application is a National Stage of International Application No. PCT/EP2020/082273, filed Nov. 16, 2020, which claims priority to DE 102019218075.2 filed Nov. 22, 2019. The entire disclosures of each of the above applications are incorporated herein by reference.

FIELD OF THE INVENTION

The invention relates to a hybridized drivetrain, in particular for a motor vehicle, having a combustion engine, an electric machine and a gearbox assembly. The invention furthermore relates to a method for controlling a hybridized drivetrain.

BACKGROUND OF THE INVENTION

This section provides information related to the present disclosure which is not necessarily prior art.

Hybridized drivetrains are known in many variations in the prior art. Said hybridized drivetrains contain a gearbox assembly in the form of one or a plurality of spur gear or planetary gear sets, a drive motor such as a combustion engine and a further drive motor such as an electric machine, so that the respective drive output of both machines can be transmitted in combination or individually to the output.

Usually, the combustion engine is able to be coupled to the gearbox assembly by means of a starting clutch, whereas a link between the electric machine and the drivetrain can in principle be freely established.

If the electric machine is disposed in the power flux between the combustion engine and the gearbox assembly or is coupled directly to a gearbox shaft of a gearbox assembly, combustion-engine gear stages, thus gear stages which are in the power flux in the purely combustion-engine operation, can at least be partially also conjointly utilized by the electric machine.

A further possibility for linking the electric machine lies in the latter being coupled to the output directly or by way of a further gearbox assembly.

The link can usually take place by means of a traction means mechanism, a spur gear stage or a planetary gearbox, wherein a gear ratio by way of which the electric machine can be operated in an efficient, high rotating speed range is preferably chosen.

However, it has proven particularly advantageous if the electric machine is coupled to the output by way of a summation gearbox in the form of a planetary gear set, in that a first element of the summation gearbox is connected to the combustion engine, a second element of the summation gearbox is connected to the electric machine, and a third element of the summation gearbox is connected to the output, as is disclosed in document DE 10 2016 221 735 A1. In this constellation, power inputs of the two drive machines converge in the summation gearbox. The rotating speeds of both drive machines are adjustable independently of the respective other drive machine, which is why the gearbox assembly can have driving characteristics which are similar to those of a continuously variable gearbox.

In principle, a summation gearbox comprises three elements, specifically a sun gear, a planet carrier and a ring gear. A plurality of planetary gearwheels which rotate about their own axis and about the axis of the sun gear are rotatably mounted on the planet carrier. It can be freely determined which of the three elements is assigned to the sun gear, the planet carrier or the ring gear. The power inputs of the combustion engine and those of the electric machine take place at two different elements of the summation gearbox and are discharged by way of the element of the summation gearbox that is connected to the output. Thus, the sun gear is connected to the electric machine, the planet carrier to the output, and the ring gear to the gearbox, for example. Or else, the sun gear is connected to the output, the planet carrier to the gearbox, and the ring gear to the electric machine, etc.

Document DE10 2018 203 563 describes a drivetrain of the type described above, having an electric machine and a combustion engine, wherein a gearbox in the form of two planetary gear sets is disposed between a summation gearbox and the combustion engine, which gearbox is upstream of the summation gearbox. Overall, this drivetrain thus comprises three planetary gear sets, this making it possible to represent driving programs such as, for example, two purely electric gear stages, four purely combustion-engine gear stages, and three hybrid gear stages. It is also possible for the combustion engine by means of the electric machine to be started while driving, this having limitations and taking into account the selection of the gear stage, or the vehicle speed, respectively.

DE 10 2015 216 896 A1 shows a drive device for a hybrid vehicle, having a combustion engine and an electric motor, as well as a torque superimposition installation for superimposing the torques generated by the combustion engine and the electric motor onto an output shaft.

The torque superimposition installation comprises a planetary gearbox assembly having two coupled planet sets, wherein each planet set has in each case one ring gear, one sun gear and one shifting element, wherein a planet carrier of the first planet set is rotatably coupled to the ring gear of the second planet set, and wherein the output shaft is rotatably coupled to a planet carrier of the second planet set.

JP 2009-1234 A shows a drive device of a hybrid vehicle provided with a motor, a motor generator and the automatic transmission, the aforementioned having a multiplicity of input clutches for forming gearshift stages. The input clutches are composed of mutually engaging input-side engagement elements which are connected to an output shaft of the motor, and of output-side engagement elements which are in each case connected to the input elements of the automatic transmission. A rotor of the motor generator is connected to the output-side engagement element of the input clutch so as to form the lowest rotating speed stage which when setting the lowest rotating speed stage is established so as to achieve a maximum gearshift ratio of the engagement elements so that output can be transmitted.

DE 11 2006 002 537 B4 shows an electrically adjustable gearbox family provides cost-effective electrically adjustable gearbox mechanisms with minor content, having a first and a second differential gear wheel set, a battery, two electric motors which serve interchangeably as motors or generators, a dog clutch and four or five selectable torque transmission installations. The differential gear wheel sets are preferably planetary gear sets; however, other gear wheel assemblies such as bevel gears or a differential gear wheel assembly on an offset axis may be used.

Nevertheless, there is still the object of improving drivetrains of this type in terms of the installation size and costs and of increasing the number of purely electric gear stages.

SUMMARY OF THE INVENTION

This section provides a general summary of the disclosure, and is not a comprehensive disclosure of its full scope or all of its features.

This object is achieved by a hybridized drivetrain, in particular for a motor vehicle, having a combustion engine, an electric machine and a gearbox assembly, wherein the gearbox assembly has at least one first planetary gear set and is configured as a summation gearbox, wherein a first element of the first planetary gear set is rotatably connected, or connectable, to the combustion engine and fixable in relation to a housing, a second element of the first planetary gear set by means of a clutch C is rotatably connectable to the electric machine and fixable in relation to the housing, a third element of the first planetary gear set is connected to an output, wherein the first element by means of a clutch D is furthermore connectable to the electric machine.

As a result of this hybridized drivetrain according to the invention, the summation gearbox can receive a drive output of the electric machine only by way of the first element, only by way of the second element or simultaneously from both elements, and transmit said drive output to the output and establish three purely electrically operated gear stages. Furthermore however, the clutches C and D can also be utilized for transmitting a drive output exclusively from the combustion engine to the output so as to establish a combustion-engine-operated gear stage. Also, the CVT gear stages known from the prior art can be implemented without restrictions, or the additional utilization of the electric machine can be implemented so as to operate in parallel with the combustion engine. As a result of the possibility of this multiple use of the two clutches C and D for implementing electrically operated, combustion-engine operated, and hybridized-operated gear stages, not only can the number of gear stages able to be shifted be increased, but the number of necessary clutches can also be minimized, or costs saved, respectively.

"Rotatably connected" or "rotatably connectable", respectively, is to be understood to mean a torque-fitting connection. "Fixable in relation to the housing" is to be understood to mean a friction-fitting or form-fitting connection to the housing.

The first planetary gear set can be configured as a simple planetary gear set or in the manner of a plus planetary gear set.

The first element of the first planetary gear set can be rotatably connected directly to the combustion engine, on the one hand. A clutch disposed in the power flux between the first element and the combustion engine and/or further planetary gear sets for reducing the rotating speed of the hybridized drivetrain are/is also conceivable.

Moreover, the first element of the planetary gear set by means of a brake can be fixable directly in relation to the housing in order for this planetary gear set to be braked. It is furthermore conceivable for the first element to be fixed indirectly in relation to the housing in that clutches and brakes of the gear assembly that are not assigned directly to the first planetary gear set but intended for actuating a further planetary gear set, for example, are utilized.

The second element of the planetary gear set by means of a brake B can preferably be fixable directly in relation to the housing, in order for this planetary gear set to be braked. It is furthermore conceivable for the second element to be fixed indirectly in relation to the housing in that clutches and brakes of the gear assembly that are not assigned directly to the first planetary gear set but are intended for actuating a further planetary gear set, for example, are utilized.

The clutches C and D preferably configure a double-clutch assembly and have a common clutch input side, wherein the common clutch input side is rotatably connected to the electric machine. The common clutch input side preferably has an input disk carrier which has disks assigned to the clutch C as well as to the clutch D.

The clutch input side of the double-clutch assembly is preferably connected to the electric machine (EM) by way of a gear wheel stage, wherein this gear wheel stage is disposed axially between the brake B and the double-clutch assembly.

According to the invention, the first element of the first planetary gear set is configured as a ring gear, the second element of the first planetary gear set as a sun gear, and the third element of the first planetary gear set as a planet carrier.

The clutch C preferably has an output disk carrier CA which is connected to the sun gear of the first planetary gear set, wherein the clutch D has an output disk carrier which is connected to the ring gear of the first planet set, wherein the input disk carrier and the output disk carrier are mounted so as to be mutually rotatable.

In the design embodiment according to the invention, the clutches C and D in terms of their disposal are nested radially with respect to one another. Furthermore, it is advantageous for the clutch D to be disposed radially outside the clutch C.

The sun gear of the first planetary gear set is preferably configured as a hollow shaft and mounted so as to be rotatable in relation to the planet carrier of the first planetary gear set.

The planet carrier of the first planetary gear set is preferably connected to the output by way of a gear wheel stage, wherein this gear wheel stage in the drivetrain is disposed on that side that lies opposite the combustion engine.

In one further advantageous, compact design embodiment it is however also conceivable for this gear wheel stage to be disposed axially between the double-clutch assembly and the first planetary gear set, wherein the electric machine in the drivetrain is disposed on that side that lies opposite the combustion engine.

The gearbox assembly particularly preferably comprises a second planetary gear set, wherein a planet carrier of the second planetary gear set is rotatably connected to the ring gear of the first planetary gear set, a sun gear of the second planetary gear set is rotatably connected to the combustion engine, a ring gear of the second planetary gear set by means of a brake E is fixable in relation to the housing, and wherein the planet carrier and the sun gear of the first planet set are rotatably connectable by means of a clutch A.

As a result of linking a further planetary gear set according to the invention in this way, three purely electrically operated, four purely combustion-engine, four hybrid parallel operation, and two CVT-operated gear stages result during operation.

The second planetary gear set is preferably disposed axially between the combustion engine and the first planetary gear set.

The drivetrain preferably comprises exclusively two planetary gear sets, specifically the first and the second planetary gear set.

It is furthermore advantageous for the combustion engine to be rotatably connected exclusively to the sun gear of the second planetary gear set and furthermore to be connectable to the planet carrier of the second planetary gear set exclusively by way of the clutch A.

The first and the second planetary gear set are preferably connected to one another exclusively by a rotationally fixed connection between the ring gear of the first planet set and the planet carrier of the second planet set, such that the second planetary gear set in the direction of the power flux, in terms of the drive output of the combustion engine, is disposed between the first planetary gear set and the combustion engine.

The electric machine is preferably disposed parallel to the first and to the second planetary gear set.

In an advantageous method for controlling a drivetrain it is proposed that a purely electrically operated, in particular a third purely electrically operated, gear stage is established in that the clutches C and D are closed. As a result of this measure, two elements of the first planetary gear set are rotatably connected to one another indirectly, and this planetary gear set is interlocked. Instead of an additionally required clutch for directly coupling these two elements, the clutches C and D which are furthermore intended for the respective link to the electric machine can be utilized.

A purely combustion-engine, in particular a second purely combustion-engine, gear stage is preferably established in that the clutches C and D and the brake E are closed.

A hybridized gear stage is preferably established in that the third purely electric gear stage and the second combustion-engine gear stage are established in combination.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
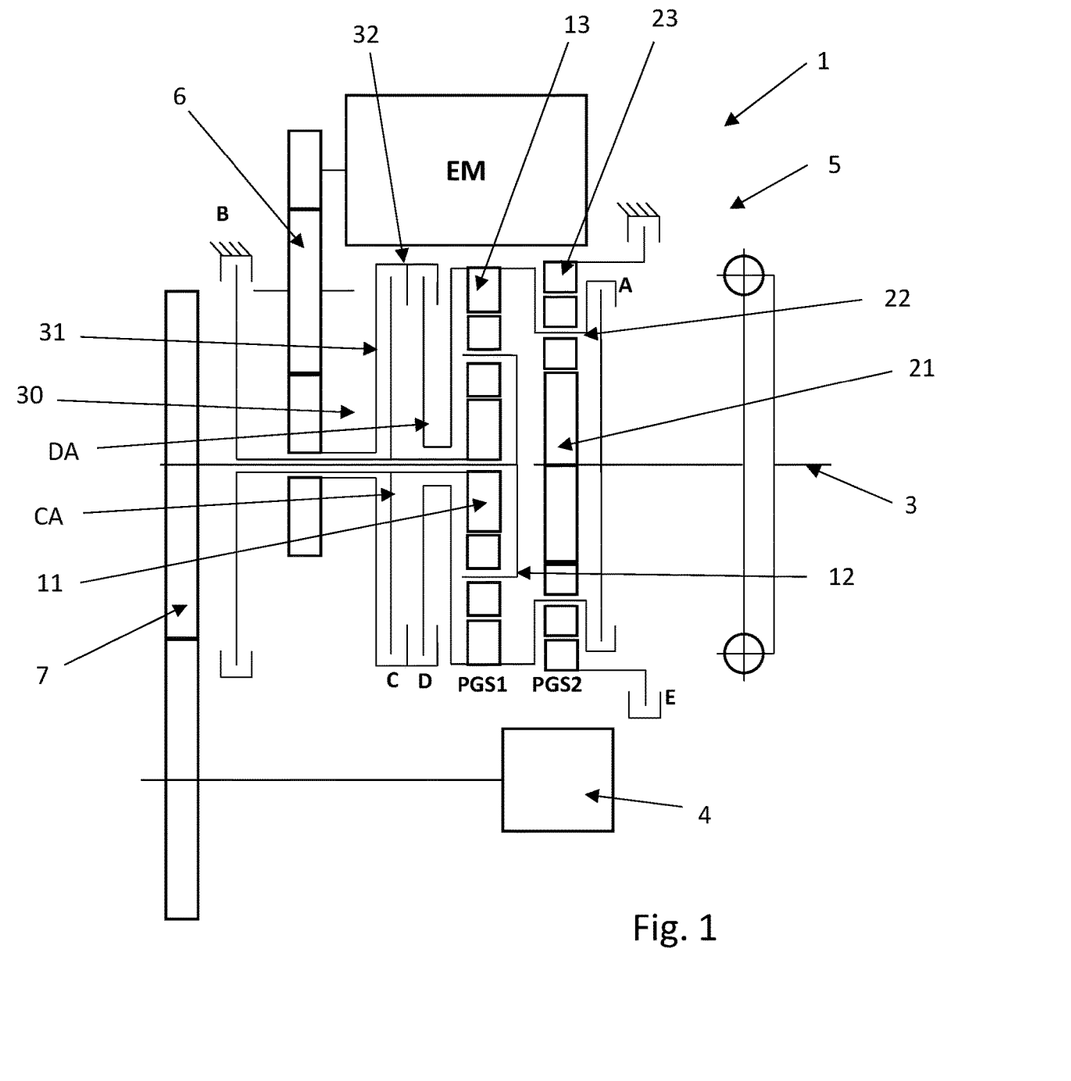
FIG. 1 shows a hybridized drivetrain according to the invention as per a first exemplary embodiment.

The hybridized drivetrain 1 shown in FIG. 1 has a combustion engine (not shown), a dual mass flywheel, a gearbox input shaft 3, a gearbox assembly 5, an electric machine EM, an output 4 and a housing.

The gearbox assembly 5 comprises a first planetary gear set PGS1 which in turn has a first element which is configured as a ring gear 13, a second element which is configured as a sun gear 11, and a third element which is configured as a planet carrier 12.

Moreover, the gearbox assembly 5 has a second planetary gear set PGS2 comprising a sun gear 21, a planet carrier 22 and a ring gear 23.

The sun gear 21 by way of the gearbox input shaft and the dual mass flywheel is connected in a rotationally fixed manner to the combustion engine. The sun gear 21 by means of a clutch A can be connected to the planet carrier 22, and the second planetary gear set PGS2 can thus be interlocked. Furthermore, the ring gear 23 by means of a brake E is fixable in relation to the housing such that the second planetary gear set PGS2 can be operated in the braked state.

The first and the second planetary gear set PGS1, PGS2 are coupled to one another exclusively by way of a rotationally fixed connection between the ring gear 13 and the planet carrier 22. The power flux of the drive output of the combustion engine runs by way of the second planetary gear set PGS2 toward the ring gear 13 of the first planetary gear set PGS1.

The first planetary gear set PGS1 is configured as a summation gearbox, i.e. the power inputs of both drive machines converge in the first planetary gear set and are discharged toward the output by way of the planet carrier 12 and a spur gear stage 7. The electric machine EM here by means of a double-clutch assembly 30, comprising a clutch C and D, is connectable to the first planetary gear set. A rotationally fixed connection between the sun gear 11 and the electric machine EM can be established by means of the clutch C. Furthermore, the electric machine EM is connectable to the ring gear 13 by means of the clutch D.

The drive output of the electric machine EM is introduced either only into the sun gear 11, only into the ring gear 13, or—as soon as both clutches C and D are closed—both into the sun gear 11 and into the ring gear 13 simultaneously into the first planetary gear set.

The first planetary gear set PGS1 is in the interlocked state once the two clutches C and D are closed.

The clutches C and D have a common clutch input side 31, wherein the common clutch input side 31 is rotatably connected to the electric machine EM. Furthermore, the common clutch input side 31 has an input disk carrier 32 which carries disks assigned to the clutch C as well as to the clutch D.

Moreover, the clutch input side 31 by way of a gear wheel stage 6 is rotatably connected to the electric machine EM, wherein the electric machine is disposed parallel to the gearbox assembly.

The sun gear 11 by means of a brake B is fixable directly in relation to the housing, as a result of which the first planetary gear set can be operated in the braked state.

The gear wheel stage 6 here is disposed axially between the brake B and the double-clutch assembly.

A gear wheel stage 7 which rotatably connects the planet carrier to the output 4 in this exemplary embodiment is disposed in the hybridized drivetrain 1 on that side that lies opposite the combustion engine.

Figure 2:
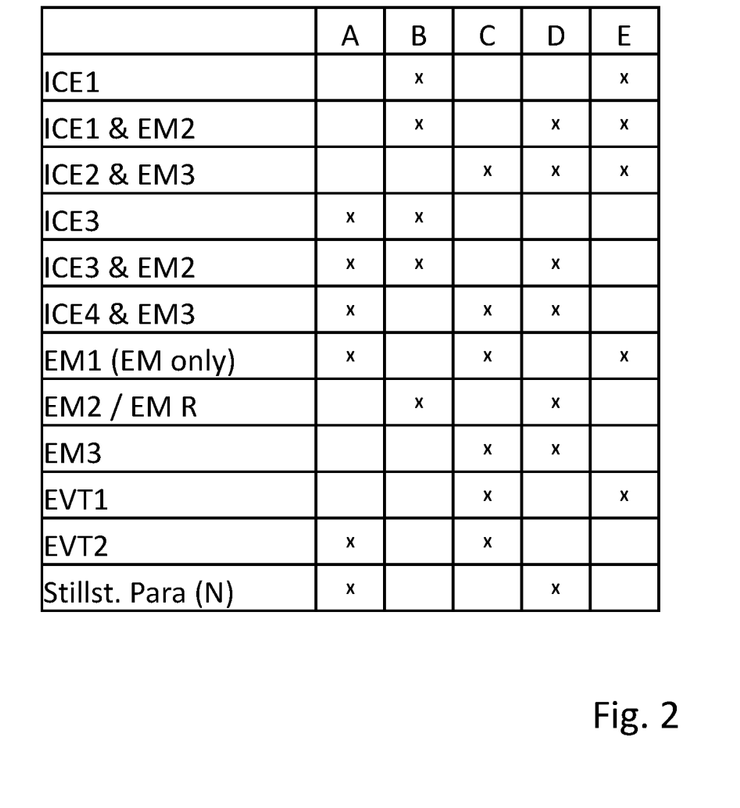
FIG. 2 shows a circuit diagram for a hybridized drivetrain as per the first exemplary embodiment.

The hybridized drivetrain 1 is configured for establishing four purely combustion-engine gear stages, in that the first and the second planetary gear set (PGS1 and PGS2) are operated in a combination of a revolving block and an epicyclic transmission. For example, a first combustion-engine gear stage according to the circuit diagram in FIG. 2 thus is established when the brake B as well as the brake E are closed, i.e. both planetary gear sets PGS1, PGS2 are braked and revolve in their epicyclic transmission. In the second combustion-engine gear stage, the two clutches C and D are closed and thus interlock the first planetary gear set, whereas the second planetary gear set PGS2 continues to be in the braked state.

Furthermore, the hybridized drivetrain 1, by adding the input of the electric machine EM, is configured for supporting the four combustion-engine gear stages in the parallel operation, or for driving said four combustion-engine gear stages in a recuperation mode. Herein, the clutch D is additionally closed as long as the latter is not already being utilized by a combustion-engine gear stage according to the circuit diagram in FIG. 2.

The first and the second electrically operated gear stages are established in that one of the two clutches C or D is closed, and the first planetary gear set PGS1 is simultaneously in the braked state.

The braked state may take place directly or indirectly. If the ring gear 13 is to be driven by the machine EM (second electric gear stage), direct braking of the first planetary gear set PGS1 takes place by the brake B in that the sun gear 11 is fixed in relation to the housing. However, if the sun gear 11 is to be driven by the electric machine EM (first electrically operated gear stage), indirect braking of the first planetary gear set PGS1 takes place by fixing the ring gear 13 in relation to the housing by way of the brake E and the clutch A, wherein the brake E and the clutch A are not assigned directly to the first but to the second planetary gear set.

According to the invention, the third purely electrically operated gear stage is established by closing the clutches C and D.

A further particularity of the hybridized drivetrain 1 lies in the possibility of being able to operate both drive machines at different rotating speeds in the so-called CVT mode. In this continuously variable operation, the electric machine by way of the clutch C is linked exclusively to the sun gear 11, whereas the combustion-engine output is directed into the ring gear 13. Therefore, the first planetary gear set remains unbraked.

Overall, this during operation thus results in three purely electrically operated gear stages, four purely combustion-engine gear stages, four hybrid parallel operation gear stages and two CVT-operated gear stages.

Figure 3:
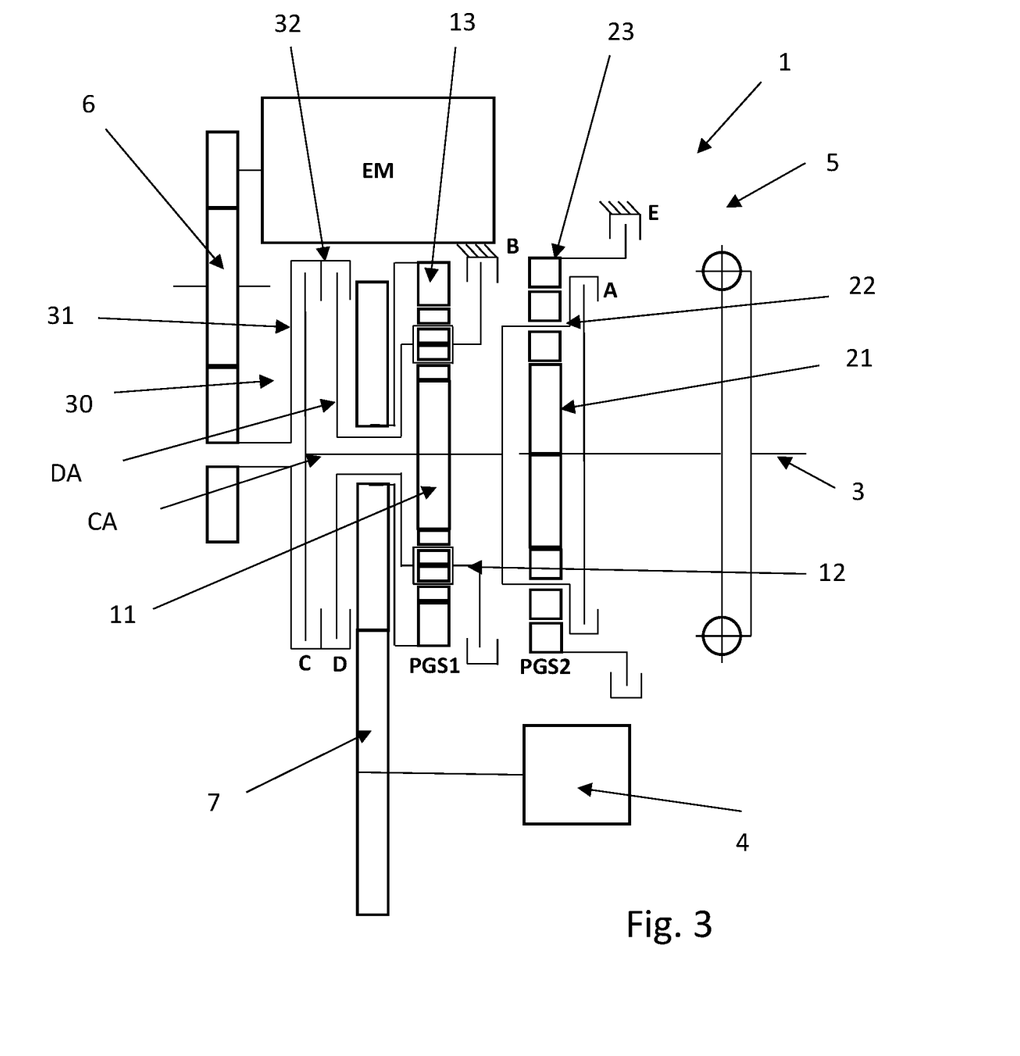
FIG. 3 shows a hybridized drivetrain according to the invention as per a second exemplary embodiment.

The hybridized drivetrain 1 shown in FIG. 3 shows a second exemplary embodiment and contains substantially the same components and is of a similar construction as the first exemplary embodiment shown in FIG. 1, which is why the same reference signs have been correspondingly used. The substantial point of differentiation lies in how the two drive machines and the output are linked to the first planetary gear set/summation gearbox. The first element of the first planetary gear set is thus assigned to the ring gear 11. The second element is assigned to the planet carrier 12, and the third element is assigned to the ring gear 13.

Furthermore, the first planetary gear set PGS1 is configured in the manner of a plus planetary gearbox.

Moreover, the gear wheel stage 6 in the hybridized drivetrain is disposed on that side that lies opposite the combustion engine. In contrast, the gear wheel stage 7 is disposed between the double-clutch assembly 30 and the first planetary gear set PGS1.

Figure 4:
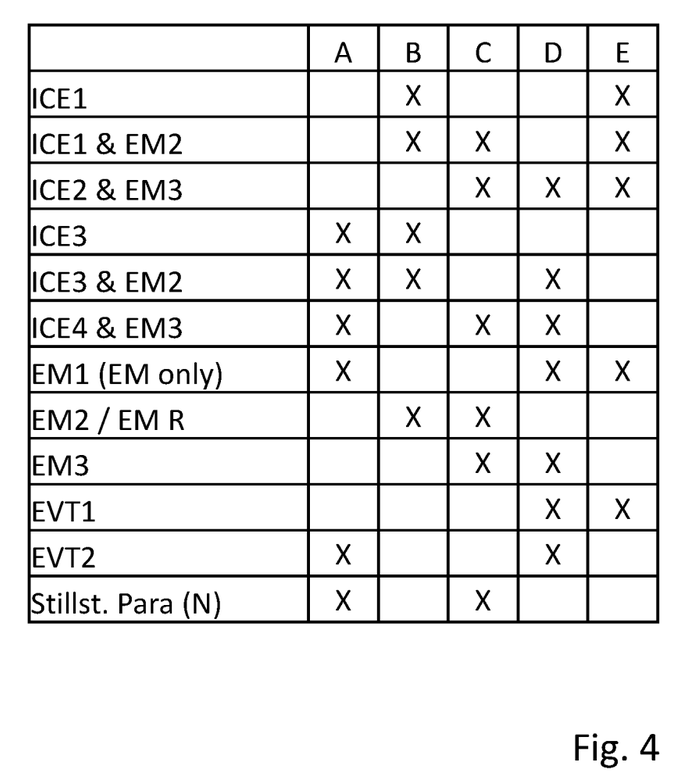
FIG. 4 shows a circuit diagram for a hybridized drivetrain as per the second exemplary embodiment.

The functional mode is identical to that of the first exemplary embodiment. The type and number of gear stages thus remains identical in each case. Shorter gear ratios of the first gears result by virtue of the different ways that the drive machines and the output are linked to the first planetary gear set PGS1, the spread being increased as a result. A gearshift logic optimized for operation can be derived from FIG. 4.

LIST OF REFERENCE SIGNS

1 Drivetrain
3 Gearbox input
4 Output
5 Gearbox assembly
6 Gear wheel stage
7 Gear wheel stage
11 Sun gear of the first planetary gear set
12 Planet carrier of the first planetary gear set
13 Ring gear of the first planetary gear set
21 Sun gear of the second planetary gear set
22 Planet carrier of the second planetary gear set
23 Ring gear of the second planetary gear set
30 Double-clutch assembly
31 Clutch input side
32 Input disk carrier
CA Output disk carrier of the clutch C
CD Output disk carrier of the clutch D
EM Electric machine
PGS1 First planetary gear set
PGS2 Second planetary gear set
A Clutch
B Brake
C Clutch
D Clutch
E Brake

What is claimed is:

1. A hybridized drivetrain for a motor vehicle, having a combustion engine, an electric machine and a gearbox assembly, wherein the gearbox assembly has at least one first planetary gear set and is configured as a summation gearbox, wherein:
   a first ring gear of the first planetary gear set is rotatably connectable to the combustion engine and fixable to a housing;
   first sun gear of the first planetary gear set is rotatably connectable to the electric machine and fixable to the housing with a first clutch;
   a first planet carrier of the first planetary gear set is connected to an output;
   wherein the first ring gear is furthermore connectable to the electric machine with a second clutch, wherein the first clutch has a first output disk carrier which is connected to the first sun gear of the first planetary gear set, wherein the second clutch has a second output disk carrier which is connected to the first ring gear of the first planetary set, and wherein an input disk carrier and the second output disk carrier are mounted so as to be mutually rotatable;
   wherein the first and second clutches configure a double-clutch assembly and have a common clutch input side, wherein the common clutch input side is rotatably connected to the electric machine;
   wherein the common clutch input side comprises the input disk carrier which carries disks assigned to the first clutch as well as to the second clutch;
   wherein the first sun gear of the first planetary gear set is fixable in relation to the housing by means of a first brake, and the common clutch input side of the double-clutch assembly is connected to the electric machine by way of a gear wheel stage, and wherein the gear wheel stage is disposed axially between the first brake and the double-clutch assembly.

2. The drivetrain as claimed in claim 1, wherein the first sun gear of the first planetary gear set is configured as a hollow shaft and is mounted so as to be rotatable in relation to the first planet carrier of the first planetary gear set.

3. The drivetrain as claimed in claim 1, wherein the first planet carrier of the first planetary gear set is connected to the output by way of a gear wheel stage, wherein the gear wheel stage is disposed on a side of the drivetrain opposite the combustion engine.

4. A hybridized drivetrain for a motor vehicle, having a combustion engine, an electric machine and a gearbox assembly, wherein the gearbox assembly has at least one first planetary gear set and is configured as a summation gearbox, wherein:
- a first ring gear of the first planetary gear set is rotatably connectable to the combustion engine and fixable to a housing;
- a first sun gear of the first planetary gear set is rotatably connectable to the electric machine and fixable to the housing with a first clutch;
- a first planet carrier of the first planetary gear set is connected to an output;
- wherein the first ring gear is furthermore connectable to the electric machine with a second clutch, wherein the first clutch has a first output disk carrier which is connected to the first sun gear of the first planetary gear set, wherein the second clutch has a second output disk carrier which is connected to the first ring gear of the first planetary set, and wherein an input disk carrier and the second output disk carrier are mounted so as to be mutually rotatable;
- wherein the gearbox assembly furthermore comprises a second planetary gear set; wherein
- a second planet carrier of the second planetary gear set is rotatably connected to the first ring gear of the first planetary gear set;
- wherein a second sun gear of the second planetary gear set is rotatably connected to the combustion engine;
- a second ring gear of the second planetary gear set is fixable in relation to the housing by means of a brake; and
- wherein the first planet carrier and the first sun gear of the first planetary set are rotatably connectable by means of a clutch.

5. The drivetrain as claimed in claim 4, wherein the drivetrain comprises exclusively the first and second planetary gear sets.

6. The drivetrain as claimed in claim 4, wherein the combustion engine is rotatably connected exclusively to the second sun gear of the second planetary gear set and furthermore is connectable to the second planet carrier of the second planetary gear set exclusively by way of the first clutch.

7. The drivetrain as claimed in claim 4, wherein the first and the second planetary gear sets are connected to one another exclusively by way of a rotationally fixed connection between the first ring gear of the first planetary set and the second planet carrier of the second planetary set.

8. A method for controlling a drivetrain as claimed in claim 1, wherein a third purely electric gear stage is established when the first and second clutches and are closed.

9. A method for controlling a hybridized drivetrain for a motor vehicle, having a combustion engine, an electric machine and a gearbox assembly, wherein the gearbox assembly has at least one first planetary gear set and is configured as a summation gearbox, wherein:
- a first ring gear of the first planetary gear set is rotatably connectable to the combustion engine and fixable to a housing;
- a first sun gear of the first planetary gear set is rotatably connectable to the electric machine and fixable to the housing with a first clutch;
- a first planet carrier of the first planetary gear set is connected to an output;
- wherein the first ring gear is furthermore connectable to the electric machine with a second clutch, wherein the first clutch has a first output disk carrier which is connected to the first sun gear of the first planetary gear set, wherein the second clutch has a second output disk carrier which is connected to the first ring gear of the first planetary set, and wherein an input disk carrier and the second output disk carrier are mounted so as to be mutually rotatable;
- wherein a second ring gear of a second planetary gear set is fixable in relation to the housing by means of a brake;
- wherein a third purely electric gear stage is established when the first and second clutches are closed; and
- wherein a second purely combustion-engine gear stage is established when the first and second clutches and the brake are closed.

10. The method for controlling a drivetrain as claimed in claim 9, wherein a hybridized gear stage is established in that the third purely electric gear stage and the second combustion-engine gear stage are established in combination.

* * * * *